Inventor
SIR FRANK WHITTLE

Aug. 12, 1969          F. WHITTLE                3,460,844
                 SEALS BETWEEN ROTATING PARTS
Filed July 10, 1964                          2 Sheets-Sheet 2

Inventor
SIR FRANK WHITTLE

By
Attorneys

United States Patent Office
3,460,844
Patented Aug. 12, 1969

3,460,844
SEALS BETWEEN ROTATING PARTS
Frank Whittle, Walland Hill, Chagford, England
Filed July 10, 1964, Ser. No. 381,832
Int. Cl. F16j 15/34, 15/38, 15/54
U.S. Cl. 277—85                                 1 Claim The invention relates to mechanical seals for preventing escape of pressurized fluid between relatively rotatable parts, of the kind comprising relatively rotatable first and second sealing elements with cooperating primary sealing faces which are separable by relative axial movement of the sealing elements, means restraining rotation of each element relatively to a respective one of the parts, and secondary sealing means, each including a secondary seal and a cooperating secondary sealing surface, acting between each sealing element and its respective part. In such seals one of the sealing elements is usually mounted for free axial movement, and the elements are pressed together with their primary sealing faces in contact with one another by springs or magnetic attraction, and the force may be augmented by pressure derived from the fluid being contained.

When used in apparatus susceptible to severe shock loading, for example rock drilling equipment for sinking oil wells, there is a possibility of the sealing elements becoming momentarily separated by transmitted shocks, and one of the objects of the present invention is to provide a seal assembly of reduced sensitivity in this respect.

According to the invention, in a seal of the kind described the secondary surfaces are of the same radius and there is means for locating both the elements relatively to the parts, with a limited range of free axial movement of both elements, and means, independent of fluid pressure, for urging the primary sealing faces into contact with one another.

By having both sealing elements freely movable axially, the transmission to them of axial shock forces from the relatively rotating parts is reduced, while by having the secondary seals operating on equal radius cylindrical surfaces the sealed pressure does not tend to move the pair of sealing elements axially and they may be supported at an intermediate position in their range of axial movement by low-rate springs having low shock transmission characteristics, the use of which is an essential feature of the invention.

One sealing element may be located concentrically relatively to its respective part, while the other element is located relatively to the other part with freedom for slight tilting. This is an arrangement similar to usual practice.

Alternatively, in accordance with a feature of the invention, both sealing elements may be concentrically located on a common part. If this part is the one least subject to shock and vibration during operation, a further improvement in immunity from seal leakage from this cause can be anticipated.

A further object of the invention is to provide a seal assembly which may be run-in and tested as part of the manufacturing procedure and then installed in or removed from the machine (for example to provide access to other parts) as a unit without the necessity of separating the sealing elements and thereby risking damage to their finely finished primary sealing faces.

To this end the assembly may include, according to a further feature of the invention, an outer sleeve for mounting in a casing, an inner sleeve for mounting on a shaft, each sleeve having a radial flange projecting towards the other sleeve, which flanges are axially spaced so as to form a substantially closed cavity between them, means for retaining the sealing elements in the cavity, and means for preventing axial separation of the sleeves.

These and other features of the invention are illustrated by the examples shown in the accompanying drawings. In the drawings.

Figure 1:
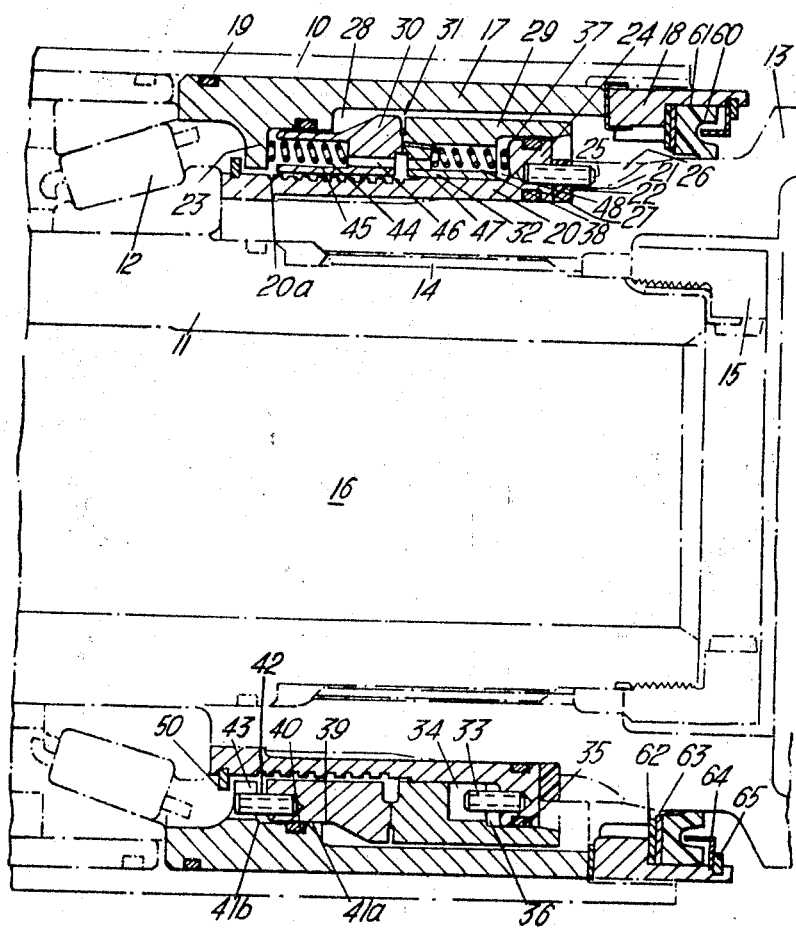
FIGURE 1 is a section passing through the axis of a seal assembly mounted between the casing and shaft of a motor for drilling oil wells, the motor parts being shown in chain-dot lines. The axis is of course vertical during normal operation, the assembly being drawn in a horizontal position for convenience.

In FIGURE 1 the casing 10 of the well-drilling motor has a shaft 11 journalled in it by means of a taper roller bearing 12 which also takes the thrust of a boring tool, which is attached to the shaft through a coupling member 13 connected to the shaft by splines 14 and a locking ring 15. The shaft 11 has a bore 16 through which drilling fluid at high pressure is supplied to the boring tool in the usual way. The bearing 12, and other bearing means further to the left, not shown in the drawing, run in lubricating oil which may be maintained at a pressure equal to or greater than that of the drilling fluid in the bore 16 and escape of which has to be prevented by a sealing assembly between the casing and the shaft.

The sealing assembly comprises an outer sleeve 17 which is locked firmly in the casing against the outer race of the bearing 12 by a locking ring 18, an O ring 19 being provided to prevent leakage at the interface, and an inner sleeve 20 which is mounted on an external surface of the coupling member 13 between a shoulder 21 on the latter and the inner race of the bearing 12, a washer 22 of resilient material, for example a polyamide, being preferably interposed to reduce shock transmission. A small clearance is allowed between the sleeve 20 and the inner race of the bearing 12 with the washer 22 uncompressed, to ensure that the axial retaining force on the bearing race is transmitted through the coupling member. The outer sleeve 17 has at its upper end (i.e. its left hand end as seen in the drawing) a radial flange 23 projecting inwards towards the inner sleeve 20, while the latter has at its lower end a radial flange 24 projecting outwards towards the outer sleeve 17. The inner sleeve is prevented from rotating relatively to the coupling member 13 by a number of dowels 25 engaging slots 26 in the coupling member, and leakage is prevented by an O ring 27. The flanges 23 and 24 and the sleeve together substantially enclose a cavity 28 in which are mounted a sealing element 29 which rotates with the inner sleeve 20 and shaft 11 and a sealing element 30 which is non-rotatable relatively to the outer sleeve 17 and the casing 10. The sealing elements have similar but oppositely directed primary sealing faces 31 the form of which will presently be described in more detail. To keep grit out of the cavity 28 in which the main sealing elements 29 and 30 are housed, there is a seal 60 of the lip type, made of elastomeric material, mounted in a recess 61 formed in the locking ring 18. A resilient washer 62 and a metal backing plate 63 are interposed between the base of the recess and the seal, and the latter is held in place by an angle section spacing ring 64 and a spring retaining ring 65.

The rotating sealing element 29 has an inner cylindrical bore 32 by which it is located on the inner sleeve 20 with freedom to slide axially, rotation relatively to the sleeve being prevented by a number of dowels 33 (see the lower half of FIGURE 1) mounted in the flange 24 and engaging slots 34 in the sealing element 29. The flange 24 also has a peripheral groove housing a secondary seal O ring 35 which engages a cylindrical bore 36 in the sealing element 29. A number of low rate springs 37 housed in recesses 38 (see the upper half of FIGURE 1) and reacting against the flange 24 urge the sealing element 29 upwards towards the other element. The outer periphery of the element 29 has a clearance spacing from the sleeve 17. This is shown exaggerated in the drawing, the clearance preferably being kept as small as possible, subject to avoiding constraint, so as to improve dissipation of heat to the sleeve 17 and the casing 10.

The non-rotating sealing element 30 has an outwardly facing cyclindrical secondary sealing surface 39, of the same radius as the bore 36 of the other element, by which it is slidably located in a bore in the outer sleeve 17, an O ring 40 being interposed to provide the secondary seal. The bore preferably comprises a short outer part 41a (see the lower half of FIGURE 1) which has only slight clearance upon the surface 39, and an inner part 41b which has increased clearance. This ensures accurate centering of the sealing element 30 but allows it to tilt to a small extent to follow any slight deviations of the primary sealing face of the rotating element from exact prependicularity. Here again the clearance at 41b is kept to a minimum to improve heat dissipation. Just sufficient clearance is provided between the inner surface of the sealing element 30 and the inner sleeve 20, which may be provided with spiral or other grooves 20a to promote oil circulation as presently more fully described, to allow the tilting action to take place. Alternatively however the element 30 may be accurately journalled on the sleeve 20, together with the rotating element 29, and steps taken during manufacture to ensure proper face to face contact of the primary sealing surfaces 31. In this case the part 41a of the bore in the outer sleeve 17 is of course a clearance fit in relation to the secondary sealing surface 39. The element 30 is prevented from rotating in the outer sleeve by a number of dowels 42 carried by the element and projecting into slots 43 in the flange 23. Low rate springs 44 housed in bores 45 in the element 30 and reacting against the flange 23 urge the element into contact with the other element 29, the two sets of springs being of selected strengths, having regard to the weight of the elements 29 and 30 acting downwards when the drill is in operation, to position the elements about half along their range of free axial movement and to provide an adequate sealing pressure between the elements in the absence of internal oil pressure. Passages 46 are provided in the element 30 for return of oil circulated by the thread 20a, such circulation further assisting dissipation of heat generated at the primary sealing faces 31. Further passages 47 through the element 29 provide communication to the space 48 between the flange 24 and the element 29. The full oil pressure consequently acts upwardly on the element 29 on an annulus the outer periphery of which is the secondary sealing surface 36 and the inner periphery the bore 32, while the element 30 is subjected to an equal downward force due to oil pressure on an annulus within the secondary sealing surface 39 of the same radius. There is therefore no oil pressure force tending to move the pair of sealing elements axially, which means that the springs 37 and 44 can have quite low rates without danger of the sealing elements becoming displaced to the end of their travel by variations in oil pressure.

Figure 2:
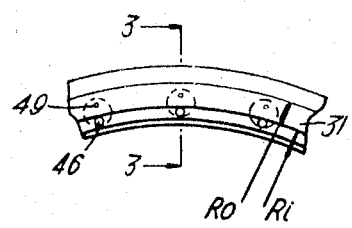
FIGURE 2 is a view on part of the primary sealing face of one of the sealing elements.
Figure 3:
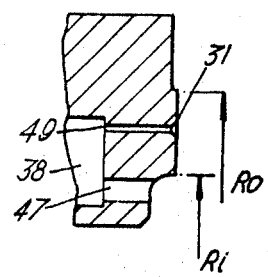
FIGURE 3 is an enlarged cross-section corresponding to the line 3—3 in FIGURE 2.

There are also equal and opposite hydraulic forces tending to separate the sealing elements. These should not be greater than the hydraulic closing force. This may be ensured, and an actual hydraulic closing force provided by arranging that the actual primary sealing faces 31 (see FIGURE 2) extend inwardly from an outer radius Ro which is substantially equal to the radius of the secondary sealing surfaces 36 and 39. The hydraulic closing force will depend upon the radial width of the primary sealing surfaces, and it can if desired be reduced substantially to zero by suitably increasing the inner radius Ri and the outer radius Ro. Lubrication of the primary sealing surfaces may be improved by providing small bore oil supply passages 49 opening into about the middle of the width of the sealing surfaces.

It should be noted that a hydraulic force the value of which is dependent upon the radius of the secondary sealing surface 36 acts downwardly upon the inner sleeve 20 in opposition to the thrust of the boring tool and therefore relieves the bearing 12 of at least part of its thrust loading. Obviously it is desirable that this hydraulic force should balance the tool thrust as nearly as possible, but the tool thrust is a variable quantity dependent upon the nature of the rock being drilled. The seal assembly is therefore designed for easy replacement, as a unit, alternative units with secondary sealing faces 36 of different radii being provided so that the most appropriate unit for the type of rock to be drilled can be selected. The unit nature of the seal assembly is obtained by the arrangement of the outer and inner sleeves 17 and 20 which with their radial flanges 23 and 24 substantially enclose the sealing elements 29 and 30 and their associated parts, endwise separation of the sleeve after assembly of the unit being prevented by a clip 50 (see the lower half of FIGURE 1) sprung into a groove in the inner sleeve 20 where it will abut the flange 23. The removal and re-fitting of a sealing assembly does not therefore involve separation of the sealing elements 29 and 30, which would involve a risk of their finely finished primary sealing surfaces 31 becoming damaged. As previously mentioned, even in cases in which frequent exchange of a seal assembly will not be required, the unit nature of the assembly has the advantage of permitting the whole unit to be run-in and tested and then installed without being dismantled.

Figure 4:
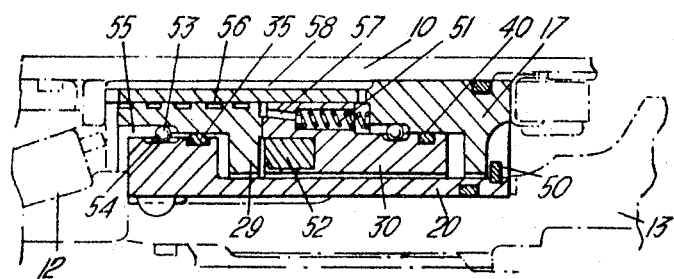
FIGURE 4 is an axial section, on one side of the axis of rotation, of a second example.

FIGURE 4 illustrates a modified seal assembly which differs from the example already described in the following principal respects. Both sealing elements 29 and 30 are slidably mounted in the outer sleeve 17, the non-rotating element 30 being lowermost and supported during normal (vertical) working of the drill by one set of springs 51 which merely support the weight of the two elements, the initial sealing pressure, in the absence of internal fluid pressure, being obtained by providing the element 30 with a permanent magnet insert 52 and making the other element of magnetic material, the inner and outer sleeves being made of non-magnetic material. The insert 52 may be a complete ring magnetised to have opposing polarities at circumferentially spaced intervals, or a number of separate magnets arranged end-to-end with opposed poles. With this arrangement the resilient secondary seal O ring 35 bearing on the rotating sealing element 29 and the torque transfer means, shows as balls 53 lodged in grooves 54 and 55 in the sleeve 20 and element 29 respectively, provide the only direct path for transmission of shocks from the shaft coupling member 13 to the sealing element. The casing 10, by virtue of its mass and that of the drill string by which it is suspended in the bore hole is of course relatively inert to high frequency shocks such as might be transmitted to it through the bearing 12 and which might cause momentary separation of the sealing elements.

In this example a screw thread 56 is provided on the rotating element 29 to circulate oil through passages 57 in the non-rotating element 30 and back through grooves 58 in the outer surface of the sleeve 17.

It is not essential for the primary sealing faces to be flat; they may alternatively be part-spherical or conical. In the example shown, the secondary sealing surfaces are on the sealing elements and the secondary seals are mounted in the inner and outer sleeve. Converse arrangements are also possible, with one or both of the secondary seals mounted in the sealing elements, and one or both of the secondary sealing surfaces on the sleeves.

I claim:

1. A combination of relatively rotatable first and second parts, relatively rotatable first and second sealing elements with cooperating primary sealing faces which are separable by relative axial movement of the sealing elements, means locating the elements relatively to the parts with a limited range of free axial movement of both elements and with each element restrained from rotation relative to a respective one of the parts, secondary sealing means, each including a secondary seal and a cooperating secondary sealing surface, acting between each sealing element and its respective part, the secondary surfaces being of the same radius, and low-rate springs acting axially between each sealing element and its respective part for urging the primary sealing faces into contact with one another, while permitting easy simultaneous axial displacement of the sealing elements relatively to the parts when the parts are subjected to axial shock, said two parts being an inner and an outer sleeve and each sleeve having a radial flange projecting towards the other sleeve, which flanges are axially spaced so as to form a substantially closed cavity between them, and means for retaining the sealing elements in the cavity, and means for preventing axial separation of the sleeves.

References Cited

UNITED STATES PATENTS

| | | | |
|---|---|---|---|
| 2,365,046 | 12/1944 | Bottomley | 277—85 X |
| 2,479,265 | 8/1949 | Roshong | 277—27 |
| 2,589,766 | 3/1952 | Bradley | 277—80 |
| 2,839,317 | 6/1958 | Haake | 277—85 |
| 2,843,403 | 7/1958 | Stevenson | 277—80 |
| 2,886,348 | 5/1959 | Porges | 277—93 |
| 3,068,012 | 12/1962 | Van Vleet | 277—27 |

FOREIGN PATENTS

| | | |
|---|---|---|
| 207,914 | 11/1955 | Australia. |
| 67,869 | 10/1957 | France. |

LAVERNE D. GEIGER, Primary Examiner

J. S. MEDNICK, Assistant Examiner

U.S. Cl. X.R.

277—80, 93, 98